United States Patent [19]

Dunki-Jacobs

[11] Patent Number: 4,596,048
[45] Date of Patent: Jun. 17, 1986

[54] OPTICALLY ISOLATED CONTENTION BUS

[75] Inventor: Robert J. Dunki-Jacobs, Ballston Lake, N.Y.

[73] Assignee: General Electric Company, Schenectady, N.Y.

[21] Appl. No.: 482,103

[22] Filed: Apr. 4, 1983

[51] Int. Cl.⁴ .............................................. H04B 9/00
[52] U.S. Cl. .................................. 455/602; 250/551; 307/311
[58] Field of Search ................ 250/551; 307/311, 241, 307/242; 372/703; 455/602; 370/67, 85

[56] References Cited

U.S. PATENT DOCUMENTS

| 3,541,239 | 11/1970 | Reid | 307/242 |
| 3,970,784 | 7/1976 | Meijerink | 250/551 |
| 4,032,843 | 6/1977 | Loucks | 250/551 |
| 4,095,125 | 6/1978 | Ingle | 307/311 |
| 4,243,890 | 1/1981 | Miller et al. | 250/551 |

FOREIGN PATENT DOCUMENTS

| 55-150639 | 11/1980 | Japan | 455/602 |
| 1411720 | 10/1975 | United Kingdom . | |
| 1415809 | 11/1975 | United Kingdom . | |
| 1465571 | 2/1977 | United Kingdom . | |
| 1492211 | 11/1977 | United Kingdom . | |

OTHER PUBLICATIONS

Great Britain Patent Application No. 2,061,672, by M. P. Gower, 5/13/81.
European Patent Application No. 0,044,685, by C. McCarthy, 1/27/82.

Primary Examiner—Joseph A. Orsino, Jr.
Attorney, Agent, or Firm—Bernard J. Lacomis; James C. Davis, Jr.

[57] ABSTRACT

Optical isolation means electrically isolates the electrical network ground of a logical contention bus from a transmitter coupled to the bus and having a local logic ground and a receiver coupled to the bus and having a remote logic ground. Optical isolation means may comprise a light source, such as a light emitting diode, and a light sensitive receiver optically coupled to and electrically isolated from the light source.

33 Claims, 6 Drawing Figures

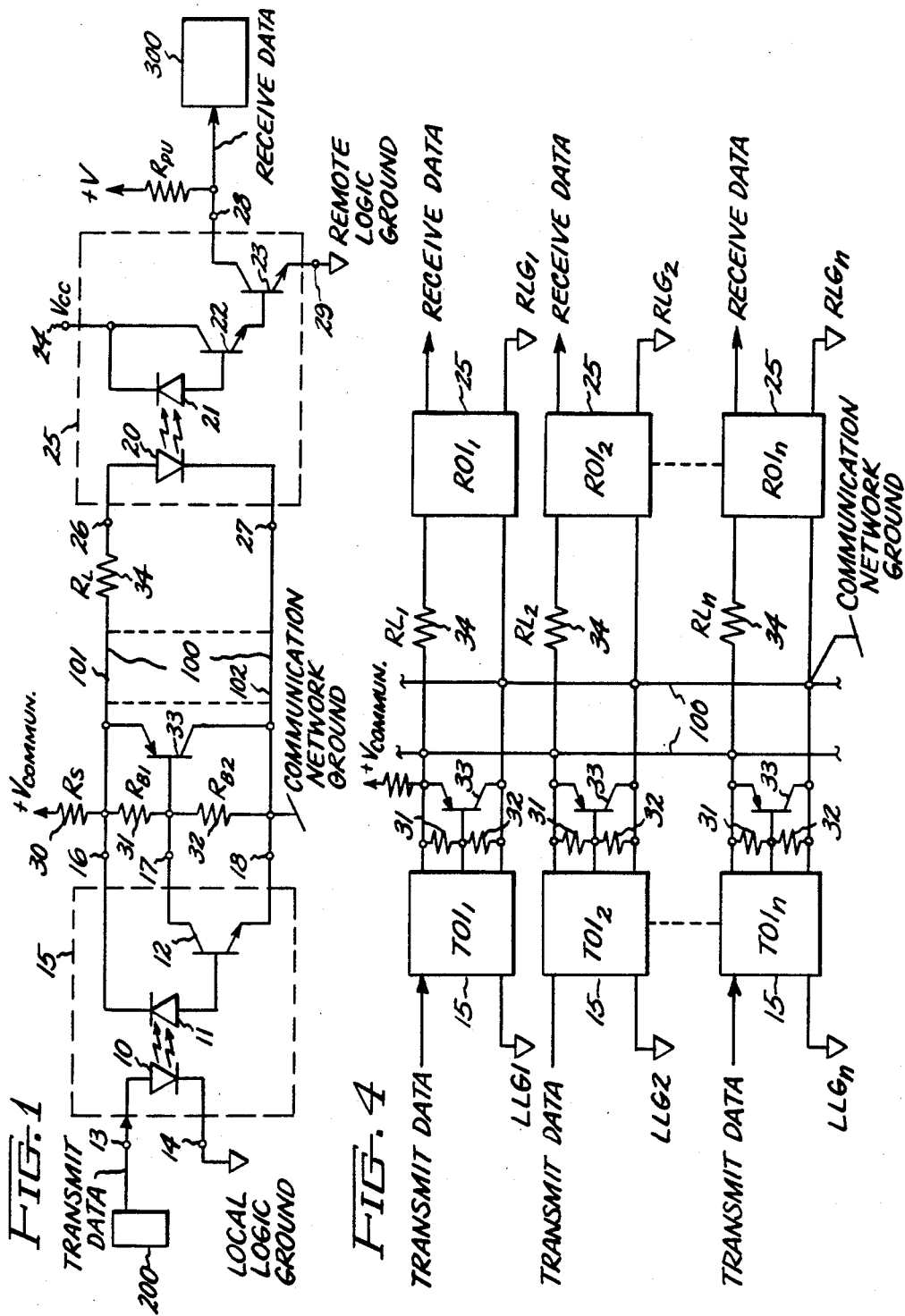

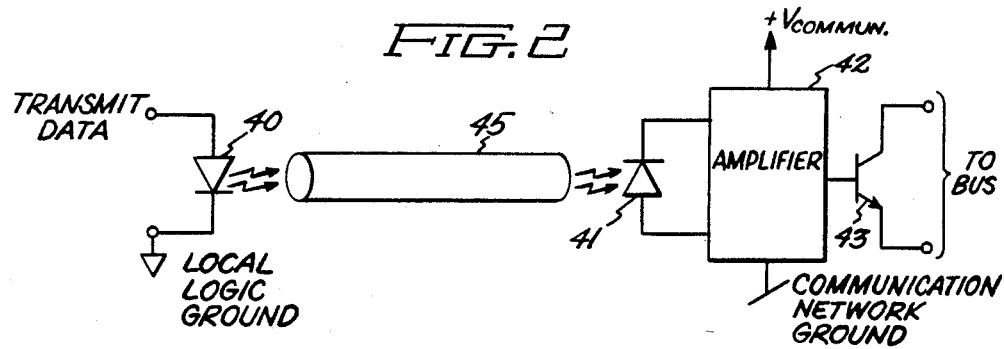
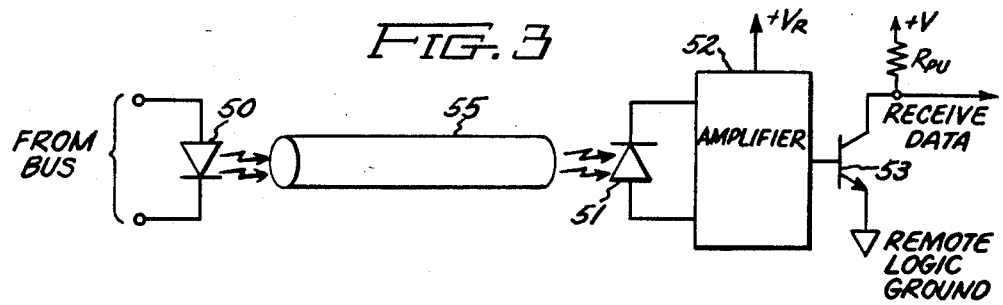
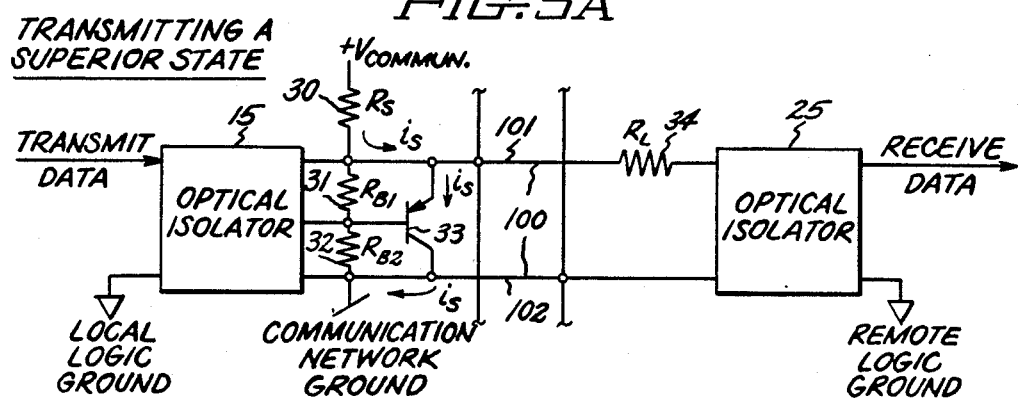
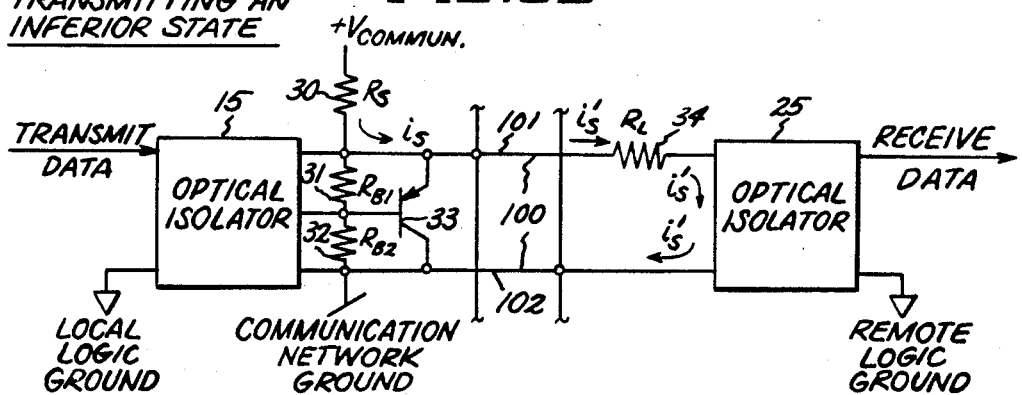

OPTICALLY ISOLATED CONTENTION BUS

BACKGROUND OF THE INVENTION

This invention relates to an optically isolated logical contention bus and more specifically to a communication system having the electrical ground of both a transmitter and a receiver electrically isolated from the electrical ground of a communicating bus therebetween.

As employed in a data communication system, a logical contention bus is generally capable of supplying two states, i.e. logical 1 and logical 0, which are typically characterized by two different bands of voltage levels. For example, in transistor-transistor logic, or TTL logic, a logical 1 is typically guaranteed by voltage within the band of 2.0 to 5.0 volts and a logical 0 is typically guaranteed by voltage within the band of 0.0 to 0.8 volts. Further, if a plurality of transmitters are coupled to the bus, one state is guaranteed to prevail in the presence of the other state where there is concurrently at least one transmitter placing a logical 1 and at least one transmitter placing a logical 0 on the bus. The guaranteed state is called the superior state and the other state is called the inferior state. Since it is relatively easy to shunt current in the bus to create the superior state, generally, for the superior state, current does not flow in the bus between transmitters and receivers coupled to the bus and for the inferior state, current flows in the bus between transmitters and receivers coupled to the bus.

In distributed communication systems, there are often large distances between processing components of the system and thus the medium comprising the communication bus, e.g. coaxial cable, twisted-pair wires, etc., must extend over these distances in order to interconnect the components. Typically, each station or group of physically close (with respect to the overall length of the bus) components comprises a transmitter and receiver, capable of placing data onto and removing data from the bus, respectively, coupled to the communication bus. Further, power supplies required to provide operating voltages to components at each station are generally connected to an electrical ground in the vicinity of each station. In hostile environments, such as near high power electrical machinery causing electromagnetic interference, large voltage transients, typically several thousand volts, (e.g. up to about 3 kV) may be coupled onto the bus, and thereby may damage expensive low-voltage signal or data generating circuitry connected to the bus. Further, a potential difference may exist between a local and a remote electrical ground thereby causing ground current to flow through the communication bus between the local and remote electrical grounds. Ground currents cause voltage shifts at the receiver which may invert the expected voltage across the receiver load. Further, large voltage shifts at the receiver input may be sensed by, and overstress, the input transformers of the power supplies causing dielectric breakdown thereof. Additionally, the potential difference between local and remote grounds may randomly vary independently over time, making compensation therefor difficult. Attempts to connect all station components in the distributed system directly to a common electrical ground would require extensive wiring or cabling along with the additional cost therefor and in some cases, such as factory automation, may not be feasible because a plurality of ground loop current paths would be created.

It would be desirable to provide a distributed data communication system wherein the data communication bus is electrically isolated from transmitters and receivers coupled thereto such that voltage transients on the bus and ground currents from the bus do not reach the circuitry of the transmitters and receivers.

Accordingly, it is an object of the present invention to provide a distributed communication system wherein a communication bus is responsive to and electrically isolated from transmitters and receivers coupled thereto.

Another object of the present invention is to provide electrical isolation between a communication bus having transients of many thousands of volts, e.g. greater than about 3 kV, and transmitters and receivers coupled thereto.

Still another object of the present invention is to reduce the effects of ground currents on the communication network.

BRIEF SUMMARY OF THE INVENTION

In accordance with the present invention, a communication system comprises a logical contention bus having an electrical network ground wherein the bus is responsive to a transmitter adapted to be coupled to the bus and wherein the transmitter is coupled to an electrical local logic ground, and isolation means coupled to the bus for electrically isolating the network ground from the local logic ground. The isolation means may comprise a light source and a light sensitive receiver wherein the light sensitive receiver is optically coupled to, and electrically isolated from, the light source.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DESCRIPTION OF THE DRAWING

FIG. 1 is a schematic diagram illustrating a communication bus responsive to and electrically isolated from a transmitter and receiver coupled thereto.

FIG. 2 is a schematic diagram showing another embodiment of transmit isolation circuitry.

FIG. 3 is a schematic diagram showing another embodiment of receive isolation circuitry.

FIG. 4 is a schematic diagram of a distributed communication system showing the interconnection of a plurality of transmit and receive isolation circuits to the communication bus.

FIGS. 5A and 5B are schematic diagrams showing the current flow in a communication bus of a distributed communication system during data transmission of a superior and inferior state, respectively.

DETAILED DESCRIPTION

Referring to FIG. 1, a logical contention bus 100 is shown coupled to a single transmitter 200 and a single receiver 300 through transmit isolation circuitry 15 and receive isolation circuitry 25, respectively. Contention bus 100 may comprise any conducting medium, such as twisted-pair wires or coaxial cable, capable of forming a closed path for current flow.

Transmit isolation circuitry 15 comprises a light source 10, such as a light emitting diode (LED), type TIES471 available from Texas Instruments, or the like, a light sensitive receiver or sensor 11, such as a photo diode type TIED80 available from Texas Instruments or the like, optically coupled to LED 10 and a transistor 12, such as a type 2N3904 available from Texas Instruments or the like, having the base thereof connected to the anode of photo diode 11. The anode of LED 10 is connected to the output of transmitter 200, whereat the transmit data signal is available. The cathod of LED 10 is connected to a local logical ground. Power supplies (not shown) and logic circuitry (not shown) for transmitter 200 are also typically coupled to the local logic ground. Alternatively, transistor isolation circuitry 15 may comprise an optical isolator type 6N136 available from Hewlett-Packard Company, or the like, wherein light source 10, light sensitive receiver 11 and transistor 12 are contained in a single integrated unit having terminals 13, 14, 16, 17 and 18 for providing appropriate electrical connections thereto. Light sensitive receiver as used herein comprises a device which changes its electrical properties or which produces electricity in response to light supplied thereto.

Receive isolation circuitry 25 comprises a light source 20, such as a light emitting diode (LED) type TIES471 available from Texas Instruments, or the like, a light sensitive receiver or sensor 21, such as a photo diode TIED801 type available from Texas Instruments or the like, optically coupled to LED 20 and transistors 22 and 23, such as a type 2N3904 available from Texas Instruments or the like, wherein the base of transistor 22 is connected to the anode of photo diode 21 and the emitter of transistor 22 is connected to the base of transistor 23. The cathode of photo diode 21 and collector of transistor 22 are coupled to operating voltage $V_{cc}$. Alternatively, receive isolation circuitry 25 may comprise an optical isolator type 6N139 available from Hewlett-Packard Company, or the like, wherein light source 20, light sensitive receiver 21 and transistors 22 and 23 are contained in a single integrated unit having terminals 24, 26, 27, 28 and 29 for providing appropriate electrical connections thereto. The open collector of transistor 23 is connected to operating voltage $+V$ through pull-up resistor $R_{pu}$ in order to ensure that the receive data signal available at the collector of transistor 23, which constitutes the output signal of receive isolation circuitry 25 and is supplied to the input of receiver 300, achieves values of about $+V$ volts or 0 volts, depending upon the logical state of the signal, wherein each voltage represents a different logical state. The emitter of transistor 23 is connected to a remote logic ground, which is electrically isolated from the local logic ground. Power supplies (not shown) and logic circuitry (not shown) for receiver 300 are also typically coupled to the remote logic ground.

Communication bus 100 comprises a first branch 101 coupled to the cathode of light sensitive receiver 11 and to the anode of LED 20 through a current limiting resistor $R_L$ and a second branch 102 coupled to the emitter of a transistor 12, the cathode of LED 20 and a communication network ground, which is electrically isolated from both the local and remote logic grounds. Switch means 33, which may comprise a switching transistor type 2N2907, available from Texas Instruments or the like, with the emitter and collector thereof coupled to the first and second branches of bus 100, respectively, acts as a current shunt between the branches when it is turned on. Biasing resistors $R_{B1}$ and $R_{B2}$, wherein $R_{B2}$ is typically much greater than $R_{B1}$, are connected between the base, and the emitter and collector, respectively, of transistor 33. The base of transistor 33 is connected to the collector of transistor 12. Communication network voltage $+V_{commun}$ is coupled to the first branch 101 of bus 100 through current limiting resistor $R_s$. Resistor $R_s$ limits the current through transistor 33 when transistor 33 is turned on.

In operation, the transmit data signal from transmitter 200 may typically assume one of two voltage levels, wherein each voltage level is within one of two bands of voltages as hereinbefore described, during each of a plurality of predetermined time intervals, each of the voltage bands being indicative of a different logical state. For the following discussion of data transmission from transmitter 200 to receiver 300 assume a logical 1 and 0 are represented by a positive voltage and zero voltage, respectively, of the transmit data signal.

In transmitting a logical 1, the positive voltage of the transmit data signal from transmitter 200 causes current to flow through LED 10 resulting in light being emitted therefrom. At least a portion of the light emitted from LED 10 is supplied to light sensitive receiver 11, generating electron-hole pairs therein, thus enabling current to flow into the base of transistor 12. Current flow into the base of transistor 12 turns transistor 12 on, dropping the voltage level at the collector of transistor 12 and base of transistor 33 to the communication network ground potential plus the relatively small potential drop from the collector to emitter of transistor 12. The resulting low base voltage of transistor 33 turns on transistor 33, thus establishing the first branch 101 of bus 100 at the communication network ground potential plus the relatively small potential drop from the emitter to collector of transistor 33. Having a relatively small voltage impressed across it, LED 20 does not emit light so that light sensitive receiver 21 remains reversed biased and transistors 22 and 23 remain turned off. Operating voltage $+V$, less the relatively small voltage drop across $R_{pu}$, is supplied to receiver 300 as the receive data signal and is indicative of a logical 1.

In transmitting a logical 0, the zero voltage of the transmit data signal from transmitter 200 prevents LED 10 from emitting light and light sensitive receiver 11 remains non-conducting, causing transistor 12 and thereby transistor 33 to be turned off. Current is supplied to the anode of LED 20 by the communication system voltage $+V_{commun}$ through current limiting resistors $R_s$ and $R_L$, which current causes LED 20 to emit light. At least a portion of the light emitted from LED 20 is supplied to light sensitive receiver 21, generating electron-hole pairs therein, thus enabling current to flow into the base of transistor 22, turning it on. When transistor 22 is turned on, current is supplied to the base of transistor 23, causing transistor 23 to turn on. When transistor 23 is turned on, the voltage at the collector of transistor 23, which is supplied to receiver 300 as the receive data signal, is at the remote logic ground voltage plus the small voltage drop from the collector to the emitter of transistor 23 and is indicative of a logical 0. Since LED 20 is a current sensitive device, i.e. emits light when the current therethrough exceeds a predetermined limit irrespective of the voltage thereacross, the current mode data signalling used for communication bus 100 (as opposed to a voltage mode data signalling) further aids in immunizing the system from ground voltage shifts. Transistors 22 and 23 form a Darlington pair which typically provides greater current gain than a single transistor. This additional current gain is necessary since the current drawn from bus 100 by LED 20 to activate or cause LED 20 to emit light is generally minimized in order to permit a maximum number of isolators 25 to be connected to bus 100. When the current through LED 20 is minimized, the current available through light sensitive receiver 21 is very small, e.g. typically less than about 100 microamperes. The Darlington transistor configuration is generally not needed for transmit isolators circuitry 15 since typically only a single transmitter 200 is coupled to light source 10 and the output stage (not shown) of transmitter 200 can supply enough current to light source 10 such that the current through light sensitive receiver 11 is substantially greater than the current through light sensitive receiver 21.

The local logic ground is electrically isolated from the communication network ground by the dielectric strength of the voltage path from the network ground through the emitter-base junction of transistor 12 plus the dielectric strength of the path from light sensitive receiver 11 to LED 10. Typically, the latter portion of the path is of much higher dielectric strength than he portion through transistor 12 and thus determines the limit on the overall isolation available between the local logic ground and the communication network ground. For the 6N136 optical isolator 15 available from Hewlett-Packard, the manufacturer specifies a maximum potential of 3 kV may be applied between LED 10 and light sensitive receiver 11.

Likewise, the remote logic ground is electrically isolated from the communication network ground by the dielectric strength of the voltage path from the network ground, combining the dielectric strength of the path from LED 20 to light sensitive receiver 21 with the dielectric strength of the serial path through the base-emitter junctions of transistors 22 and 23. Typically, the former path is of much higher dielectric strength than the path through transistors 22 and 23 and thus determines the limit on the overall isolation available between the communication network ground and the remote logic ground. For the 6N139 optical isolator 25 available from Hewlett-Packard, the manufacturer specifies a maximum of 3 kV may be applied between cathode of LED 20 and anode of light sensitive receiver 21.

The maximum voltage rating of both the 6N136 and 6N139 optical isolators is limited by the physical distance or spacing between LEDs 10 and 20 and light sensitive receivers 11 and 21, respectively. Generally, as the physical distance between a light source and light sensor increases, the dielectric strength therebetween increases. However, the maximum operational separation between the light source and light sensor is limited by the intensity of the light source, the sensitivity of the light sensor and the fraction of the total light produced by the source supplied to the sensor.

Referring to FIG. 2, a schematic diagram of another embodiment of transmit isolation circuitry is shown. This circuitry comprises a light source 40, such as a light emitting diode (LED) type TXES475, available from Texas Instruments, or the like, a light sensitive receiver or sensor 41, such as a photo diode type TXED453 available from Texas Instruments or the like, amplifier means 42 having an input connected to a source of system operating voltage $+V_{commun}$ and having other inputs connected to each of the anode and cathode of photo diode 41, for amplifying the current through photo diode 41, a voltage reference or voltage shift transistor 43 having an open collector configuration with the base thereof connected to the output of amplifier 42 for supplying a signal at the transistor 43 collector indicative of the transmit data signal provided to the anode of LED 40, and optical coupling means 45 for optically coupling LED 40 and light sensitive receiver 41. Voltage reference transistor 43 allows the collector thereof to be connected to a source of operating voltage (not shown) through a pull-up resistor (not shown) such that the voltage levels available at the collector of transistor 43 are indicative of first and second logic states when transistor 43 is turned on and turned off, respectively. Transistor 43 may not be needed if the voltage of signal available at the output of amplifier 42 is compatible with receivers coupled to bus 100. Optical coupling means 45 may comprise a single strand or a plurality of strands or bundle of fiber optic material having low power loss associated with at least one frequency of light emitted by LED 40 and adapted to direct light (at the at least one frequency of light from LED 40) from LED 40 to light sensitive receiver 41 without excessive dispersion or power loss thereof, thereby providing substantially the entire output intensity of light from LED 40 to light sensitive receiver 41. Optical coupling means 45 may be fabricated arbitrarily long in order to increase spacing and thereby dielectric strength between LED 40 and light sensitive receiver 41.

Referring to FIG. 3, a schematic diagram of another embodiment of receive isolation circuitry is shown. This circuitry comprises a light source 50, such as a light emitting diode (LED) type TXES 475, available from Texas Instruments, or the like, a light sensitive receiver 51, such as a photo diode, type TXED 455, available from Texas Instruments or the like, amplifier means 52, having an input connected to a source of operating receive voltage $+V_R$ and having other inputs connected to each of the anode and cathode of light sensitive receiver 51, for amplifying the current through receiver 51, a voltage reference or voltage shift transistor 53 having an open collector configuration with the base thereof connected to the output of amplifier 52 for supplying the receive data signal at the transistor 53 collector, a pull-up resistor for providing a source of operating voltage $+V$ to the collector of transistor 53, and optical coupling means 55 for optically coupling LED 50 and light sensitive receiver 51. Voltage reference transistor 53 allows the collector thereof to be connected to a source of operating voltage $+V$ through pull-up resistor $R_{pu}$ such that the voltage levels available at the collector of transistor 53 are indicative of first and second logic states when transistor 43 is turned on and turned off, respectively. Transistor 53 may not be needed if the voltage of the signal available at the output of amplifier 52 is compatible with a receiver (not shown) connected to the output of amplifier 52. Optical coupling means 55 may comprise a single strand or a plurality of strands or bundle of fiber optic material, having low power loss associated with at least one frequency of light emitted by LED 50 and adapted to direct light (at the at least one frequency of light from LED 50) from LED 50 to light sensitive receiver 51 without excessive dispersion or power loss thereof, thereby providing substantially the entire output intensity of light from LED 50 to light sensitive receiver 51. Optical coupling means 45 may be fabricated arbitrarily long in order to increase spacing and thereby dielectric strength between LED 50 and light sensitive receiver 41.

For example, in the configurations of FIGS. 2 and 3 the dielectric strength of optical coupling means 45 and 55 is about 100 kV/meter. Thus by fabricating optical coupling means 45 and 55 about 3 centimeters long a dielectric strength of about 3 kV may be obtained between the communication network ground and each of the local and remote logic grounds, respectively. Should a greater dielectric strength be desired, then the length of optical coupling means 45 and/or 55 may be increased.

Shown in FIG. 4 is a plurality of transmit optical isolators (TOI) 15 and a plurality of receive optical isolators (ROI) 25 coupled to communication bus 100. The communication network ground is isolated from each local logic ground (LLG) and each remote logic ground (RLG) by respective TOI 15 and ROI 25 circuits. Typically, each station (not shown) of the system comprises a TOI 15 and a ROI 25. Communication network operating voltage $+V_{commun}$ may be supplied by a power supply (not shown) providing power to a station; however, for redundancy and reliability, voltage $+V_{commun}$ is preferably provided from a separate power supply (not shown).

Shown in FIGS. 5A and 5B is a single transmit optical isolator 15 and a single receive optical isolator 25 coupled to communication bus 100. FIG. 5A shows the current flow $i_s$ in the system when transistor 33 is turned-on during transmission of a superior state, which is assumed to be a logical 1. Regardless of the number of other transmit optical isolators 15 coupled to bus 100 or of the logical state they are attempting to transmit (assume all but one of a plurality of transmit isolators 15 coupled to bus 100 are attempting to transmit a logical 0 and the remaining one transmit isolator 15 is attempting to transmit a logical 1), all current on bus 100 is shunted through transistor 33 (which is turned on by transmit isolator 15 attempting to transmit a logical 1) to the communication network ground, thus ensuring that all receive isolators 25 coupled to bus 100 sense a logical 1.

FIG. 5B shows the current flow $i'_s$ in the system when transistor 33 is turned off during transmission of an inferior state, which is assumed to be a logical 0. Current $i'_s$ is the current which flows into a single receiver and current $i_s$ is the current available to supply all receivers coupled to bus 100. Current flows from limiting resistor $R_s$, across the first branch 101 of bus 100, through limiting resistor $R_L$, through receive isolator 25 and returns to the communication network ground.

Thus has been illustrated and described a distributed communication system wherein a communication bus is responsive to and electrically isolated from transmitters and receivers coupled thereto and wherein the effects of ground currents on the communication network are reduced. Although in each system the superior and inferior states are defined as a logical 1 and logical 0, respectively, those skilled in the art will recognize that they may be defined as a logical 0 and logical 1, respectively.

Further, although optical isolators 15 and 25 comprise LEDs 10 and 20, respectively, which each typically emit light (an electromagnetic radiation) in the visible spectrum and appropriate photo diode sensors 11 and 12, respectively, it is to be understood by those skilled in the art that isolators 15 and 25 may comprise sources 10 and 20, respectively, of other forms of electromagnetic radiation, such as infra-red (IR), ultra-violet (UV), microwaves, etc., and appropriate sensors 11 and 12, respectively, being responsive to the radiation emitted by their associated sources 10 and 20, respectively. For example, source 10 may comprise a Gunn diode which produces microwaves and sensor 11 may comprise a tunnel diode which detects microwaves.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A communication system comprising:
   (a) transmission means coupled to an electrical local logic ground and operative to transmit distinct first and second data signals;
   (b) receiving means coupled to an electrical remote logic ground for receiving said first and second data signals;
   (c) a logical contention bus having an electrical network ground, said bus being adapted to be in data communication with said transmission means and said receiving means, said bus including first and second branches, said second branch being coupled to said network ground;
   (d) first and second isolation means coupled to said bus for electrically isolating said network ground from said local logic ground and said remote logic ground, respectively; and
   (e) switching means coupled to said first isolation means, said first branch and said second branch, for receiving said first and second data signals, said switching means being adapted to couple said first branch to said second branch upon receipt of and irrespective of the duration of said first data signal.

2. The system of claim 1 wherein said switching means comprises a transistor.

3. The system of claim 1 wherein said first isolation means comprises a first source of electromagnetic radiation radiantly coupled to and electrically isolated from a first electromagnetic radiation sensitive receiver, said first source of electromagnetic radiation adapted to be electrically coupled to said transmission means and said first electromagnetic radiation sensitive receiver being electrically coupled to said bus and wherein said second isolation means comprises a second source of electromagnetic radiation radiantly coupled to and electrically isolated from a second electromagnetic radiation sensitive receiver, said second source of electromagnetic radiation being electrically coupled to said bus and said second electromagnetic radiation sensitive receiver adapted to be electrically coupled to said receiving means.

4. The system of claim 1 wherein said first isolation means comprises a first source of light optically coupled to and electrically isolated from a first light sensitive receiver, said first source of light adapted to be electrically coupled to said transmission means and said first light sensitive receiver being electrically coupled to said bus, and wherein said second isolation means comprises a second source of light optically coupled to and electrically isolated from a second light sensitive receiver, said second source of light being electrically coupled to said bus and said second light sensitive receiver adapted to be electrically coupled to said receiving means.

5. The system of claim 4 including a fiber optic strand coupling said first source of light to said first light sensitive receiver.

6. The system of claim 4 including a fiber optic strand coupling said second source of light to said second light sensitive receiver.

7. The system of claim 4 including a first fiber optic strand coupling said first source of light to said first light sensitive receiver and a second fiber optic strand coupling said second source of light to said second light sensitive receiver.

8. The system of claim 4 wherein said first and second source of light comprises first and second light emitting diodes, respectively.

9. The system of claim 8 including a fiber optic strand coupling said first LED to said first light sensitive receiver.

10. The system of claim 8 including a fiber optic strand coupling said second LED to said second light sensitive receiver.

11. The system of claim 8 including a first fiber optic strand coupling said first LED to said first light sensitive receiver and a second fiber optic strand coupling said second LED to said second light sensitive receiver.

12. A communication system comprising:
(a) a plurality of transmission means, each transmission means coupled to a separate electrical local logic ground and each operative to transmit first and second data signals;
(b) receiving means coupled to an electrical remote logic ground and operative to receive said first and second data signals;
(c) a logic contention bus having an electrical network ground, said bus adapted to be in data communication with each of said plurality of transmission means and said receiving means, said bus including first and second branches, said second branch being coupled to said network ground;
(d) first isolation means coupled to said bus for electrically isolating said network ground from said remote logic ground;
(e) a plurality of second isolation means, each of said plurality of second isolation means coupled to said bus and to one of each of said plurality of transmission means for electrically isolating said network ground from each of the electrical local logic grounds; and
(f) a plurality of switching means, each of said switching means coupled to a different one of said plurality of second isolation means, said switching means being further coupled to said first and second branches for coupling said first branch to said second branch in response to each said first data signal received from the one of each of said plurality of transmission means coupled to the one of said plurality of second isolation means.

13. The system of claim 12 wherein each of said plurality of switching means comprises a transistor.

14. The system of claim 12 wherein said first isolation means comprises a first source of electromagnetic radiation radiantly coupled to and electrically isolated from a first electromagnetic radiation sensitive receiver, said first source of electromagnetic radiation being electrically coupled to said bus and said first electromagnetic radiation sensitive receiver adapted to be electrically coupled to said receiving means and wherein at least one of said second isolation means comprises a second source of electromagnetic radiation radiantly coupled to and electrically isolated from a second electromagnetic radiation sensitive receiver each said second source of electromagnetic radiation adapted to be electrically coupled to a different one of said plurality of transmission means and said second electromagnetic radiation sensitive receiver being electrically coupled to said bus.

15. The system of claim 12 wherein said first isolation means comprises a first source of light optically coupled to and electrically isolated from a first light sensitive receiver, said first source of light being electrically coupled to said bus and said first light sensitive receiver adapted to be electrically coupled to said receiving means, and wherein at least one of said plurality of second isolation means comprises a second source of light optically coupled to and electrically isolated from a second light sensitive receiver, each second source of light adapted to be electrically coupled to one of each of said plurality of transmission means and each of the second light sensitive receivers being electrically coupled to said bus.

16. The system of claim 15 including a fiber optic strand coupling said first source of light to said first light sensitive receiver.

17. The system of claim 15 including for at least one of said second isolation means a fiber optic strand coupling said second source of light to said second light sensitive receiver.

18. The system of claim 15 including a first fiber optic strand coupling said first source of light to said first light sensitive receiver and for at least one of second isolation means a second fiber optic strand coupling said second source of light to said second light sensitive receiver.

19. The system of claim 15 wherein said first source of light comprises a first light emitting diode and each of the second sources of light comprises a second light emitting diode.

20. The system of claim 19 including a fiber optic strand coupling said first LED to said first light sensitive receiver.

21. The system of claim 19 including for at least one of said second isolation means a fiber optic strand coupling said second LED to said second light sensitive receiver.

22. The system of claim 19 including a first fiber optic strand coupling said first LED to said first light sensitive receiver and for at least one of said second isolation means a second fiber optic strand coupling said second LED to said second light sensitive receiver.

23. A communication system comprising:
(a) a plurality of transmission means, each transmission means coupled to a separate electrical local logic ground and operative to transmit distinct first and second data signals;
(b) a plurality of receiving means, each receiving means coupled to a separate electrical remote logic ground and operative to receive said first and second data signals;
(c) a logical contention bus having an electrical network ground, said bus adapted to be in data communication with each of said plurality of transmission means and each of said plurality of receiving means, said bus including first and second branches, said second branch being coupled to said network ground;
(d) a plurality of first isolation means, each of said plurality of first isolation means coupled to said bus and to one of each of said plurality of transmission means for electrically isolating said network ground from each of the electrical local logic grounds;

(e) a plurality of second isolation means, each of said plurality of second isolation means coupled to said bus and to one of each of said plurality of receiving means for electrically isolating said network ground from each of the electrical remote logic grounds; and (f) a plurality of switching means, each of said switching means being coupled to a different one of said plurality of first isolation means, each said switching means being further coupled to said first and second branches for coupling said first branch to said second branch in response to each said first data signal received from the one of said plurality of transmission means coupled to the one of said plurality of first isolating means.

24. The system of claim 23 wherein each of said plurality of switching means comprises a transistor.

25. The system of claim 23 wherein at least one of said plurality of first isolation means comprises a first source of electromagnetic radiation radiantly coupled to and electrically isolated from a first electromagnetic radiation sensitive receiver, each said first source of electromagnetic radiation adapted to be electrically coupled to a different one of said plurality of transmission means and each said first electromagnetic radiation senisitive reciever being electrically coupled to said bus and wherein at least one of said second isolation means comprises a second source of electromagnetic radiation radiantly coupled to and electrically isolated from a second electromagnetic radiation sensitive receiver, each said second source of eletromagnetic radiation being electrically coupled to said bus and each said second electromagnetic radiation sensitive receiver adapted to be electrically coupled to a different one of said plurality of receiving means.

26. The system of claim 25 wherein at least one of said plurality of first isolation means comprises a first source of light optically coupled to and electrically isolated from a first light sensitive receiver each of the first sources of light adapted to be electrically coupled to one of each of said plurality of transmission means and each first light sensitive receiver being electrically coupled to said bus and wherein at least one of said plurality of second isolation means comprises a second source of light optically coupled to and electrically isolated from a second light sensitive receiver, each second source of light being electrically coupled to said bus and each second light sensitive receiver adapted to be electrically coupled to one of each of said plurality of receiving means.

27. The system of claim 26 including for at least one of said first isolation means a fiber optic strand coupling said first source of light to said first light sensitive means.

28. The system of claim 26 including for at least one of said second isolation means a fiber optic strand coupling said second source of light to said second light sensitive receiver.

29. The system of claim 26 including for at least one of said first isolation means a first fiber optic strand coupling said first source of light to said first light sensitive receiver and further including for at least one of said second isolation means a second fiber optic strand coupling said second source of light to said second light sensitive receiver.

30. The system of claim 26 wherein each of the first sources of light comprises a first light emitting diode and each of the second sources of light comprises a second light emitting diode.

31. The system of claim 30 including for at least one of said first isolation means a fiber optic strand coupling said first LED to said first light sensitive receiver.

32. The system of claim 30 including for at least one of said second isolation means a fiber optic strand coupling said second LED to said second light sensitive receiver.

33. The system of claim 30 including for at least one of said first isolation means a first fiber optic strand coupling said first LED to said first light sensitive receiver and further including for at least one of said second isolation means a second fiber optic strand coupling said second LED to said second light sensitive receiver.

* * * * *